United States Patent Office 2,715,616
Patented Aug. 16, 1955

2,715,616
ORGANIC COATING FOR WIRE

Robert M. MacIntosh, Columbus, Ohio, assignor to the United States of America as represented by the Secretary of the Army No Drawing. Application December 20, 1951,
Serial No. 262,660

6 Claims. (Cl. 260—31.2)

This invention relates to self-fluxing coatings for electrical conductors and more particularly, this invention relates to self-fluxing coatings for copper wire.

Because tin is a critical material, especially in a time of war or a period of extensive military preparedness, it is essential that its use be minimized as much as possible. A substantial saving in tin can be realized by replacing the tin coatings on copper wire with a non-critical material.

The substitute for the tin coating should possess approximately the same soldering properties as the tin coating and it should serve as an adequate barrier between the conductor and the insulation. In addition, the coating should function satisfactorily in a wide temperature range, preferably in the range of about —55° C. to 200° C. To enable the use of the coating in all types of climatic conditions, particularly in tropical exposures, high humidity resistance and resistance to fungal growth are important.

The principal object of this invention is to provide an organic coating possessing properties substantially equivalent to that of a tin coating.

A further object of this invention is to provide an organic coating which allows efficient and quick soldering with minimum amounts of solder.

A still further object is to provide an organic coating which is self fluxing and characterized by such continuity as to furnish a barrier against tarnish.

Another object is to provide an organic coating which will not be adversely affected in a wide temperature range, and which has a high humidity resistance and resistance to fungal growth.

These and other objects and advantages of the present invention will be better understood as the detailed description thereof progresses.

The present invention is based upon the discovery that certain organic compositions and mixtures thereof meet the requirements of a substitute for a tin coating. In accordance with my discoveries, organic coatings for conductors have been produced which withstand a temperature of 200° C., have continuous and flexible films which can be soldered together with a light application of a soldering iron and solder without the necessity of using a fluxing agent. The average coating thickness of these organic films is about 0.0002 inch.

Compositions of organic flux materials containing resin carriers are very effective substitute coverings for tin. Examples of organic flux materials which can be used are modified resins, citric acid, lactic acid, amines, amides, mannitol, glycerin and combinations thereof. Examples of good resin carriers are vinyl chloride-vinyl acetate polymers, polyamides, alkyd resins, silicones, and blends of these resins.

In the following table, there are listed components of various solutions. These solutions, applied to wire conductors with the subsequent baking of the coated wire in an electric oven at 200° C. for about 5 minutes, form coatings which give excellent results as to continuity and flexural strength, and are solderable without the application of an external flux. In the table, Rezyl 330-5 is an oxidizing type synthetic alkyd resin made from phthalic anhydride and modified principally with drying type fatty acids or oils. Polyamides 93 and 95 are alcohol soluble resins which are the ethylene diamine polyamide of dimerized and trimerized linoleic and linolenic acids. They are tough resins, not tacky at room temperatures, and possess excellent adhesion at elevated temperatures just below the molten condition. Silicone 993 is a silicone resin which has exceptional heat stability and moisture resistance. Geon 202 is a co-polymer of vinyl chloride and vinylidene chloride.

| Coating Composition | Percent Solids | Solvent Balance |
|---|---|---|
| 1. Vinyl chloride-vinyl acetate polymer | 5 | Toluene-1. |
| Lactic acid-mannitol 1:4 | 5 | Methyl ethyl ketone-1. |
| 2. Vinyl chloride-vinyl acetate polymer | 5 | Methyl ethyl ketone. |
| 3. Vinyl chloride-vinyl acetate polymer | 5 | Do. |
| Rosin | 2 | Do. |
| 4. Vinyl chloride-vinyl acetate polymer | 5 | Do. |
| Alkyd resin (such as Rezyl 330-5) | 0.5 | Toluene. |
| 5. Alkyd resin (such as Rezyl 330-5) | 5 | Xylene. |
| Rosin | 5 | |
| 6. Cellulose acetate butyrate (such as Tenite II) | 1 | Toluene. |
| Polyamide (such as polyamide 95) | 10 | |
| Rosin | 5 | |
| 7. Alkyd resin (such as Rezyl 330-5) | 1 | Xylene. |
| Polyamide (such as Polyamide 95) | 1.5 | |
| Rosin | 2.5 | |
| 8. Silicone (such as silicone 993) | 5 | Toluene. |
| Polyamide (such as Polyamide 93) | 2.5 | |
| Rosin | 2.5 | |
| 9. Vinyl polymer (such as Geon 202) | 4 | Amyl Acetate. |
| Lactic acid-mannitol 1:4 | 5 | |

These coating compositions are prepared by dissolving the solid constituents in the hot solvent, applying the resulting solution to the wire conductor by conventional methods such as dipping, spraying etc., and then baking the coated wire for about 5 minutes at about 200° C. in an electric oven. Upon completion of the baking, the solvent will have been completely evaporated and the coating will comprise the organic flux material and the resin carrier in a weight ratio equal to the ratio of their percentages in the coating solution.

The efficacy of these compositions with respect to the various characteristics being sought as set forth above in the objects was tested as follows:

To determine heat stability, seven inch lengths of 16-gage copper wire were cleaned in acid, rinsed and wiped dry. The wires were then dipped to a depth of 6 inches in the coating solution, drained, and the uncoated end threaded through a hole in a brass rod. Five wires were prepared at one time. The rods were then suspended in an electric oven at 200° C. for five minutes. At the end of this period the rods were removed and allowed to cool. The coated wires were examined for tackiness in the hot and cold condition. They were then bent and immersed in polysulphide solution. This is a test for brittleness as any crack in the coating would expose the underlying copper to reaction with the polysulphide solution and black copper sulphide spots would form where the coating failed. Visual examination of the coated wires prepared from the solutions listed in the table above showed no discoloration and their coatings were smooth.

Coating thickness was determined by weighing the wires prior to coating and after they had been coated and baked for about 5 minutes in an electric oven at 200° C.

To determine continuity of coating, the baked wire specimens were immersed in a strong solution of polysulphide. This method can be used to detect the slightest pinhole in the coating by the appearance of a black copper sulphide spot on the wire. In the case of the coated specimens prepared from the compositions listed in the above table, no pinholes were thus detected.

The ability of the coated wire to resist severe bending without rupture of the coating was determined by winding the baked wire specimen on a 5/16 inch diameter rod and then immersing it in polysulphide solution and examining it visually for black discoloration. No discoloration was noted on coated wire specimens prepared from the compositions listed in the above table.

Solderability of the baked wire specimens was determined by hand soldering tests. A length of coated wire was bent in a small loop and drawn together in a straight line, as in a hairpin, with only a small space between the two pieces of wire. A piece of 50 tin-50 lead wire solder was laid between the wires and touched with the soldering iron in a wiping stroke. The self-fluxing coatings allowed the holder to flow freely throughout the length of the joint with a light wipe of the iron.

While there have been described what at present are considered to be the preferred embodiments of the invention, it will be understood by those skilled in the art that various changes and modifications may be made herein without departing from the invention and it is therefore aimed in the appended claims to cover all such modifications as fall within the spirit and scope of the invention.

What is claimed is:

1. A wire conductor, a self-fluxing coating thereon, said coating consisting essentially of about 5 parts by weight of a mixture consisting 1 part by weight of lactic acid and 4 parts by weight of mannitol and about 4 to 5 parts by weight of a resin selected from the group consisting of vinyl chloride-vinyl acetate polymer and vinyl chloride-vinylidene chloride co-polymer.

2. A wire conductor, a self-fluxing coating thereon, said coating consisting essentially of about 5 parts by weight of vinyl chloride-vinyl acetate copolymer, and 5 parts by weight of a mixture of 1 part by weight of lactic acid and 4 parts by weight of mannitol.

3. A wire conductor, a self-fluxing coating thereon, said coating consisting essentially of about 4 parts by weight of vinyl chloride-vinylidene chloride co-polymer and 5 parts by weight of a mixture of 1 part by weight of lactic acid and 4 parts by weight mannitol.

4. A composition for forming a self-fluxing coating on a wire conductor consisting essentially of about 4% by weight of vinyl chloride-vinylidene co-polymer, 5% by weight of a mixture of 1 part by weight of lactic acid and 4 parts by weight of mannitol, and the remainer amyl acetate.

5. A composition for forming a self-fluxing coating on a wire conductor consisting essentially of about 4 to 5% by weight of a resin selected from the group consisting of vinyl chloride-vinyl acetate polymer and vinyl chloride-vinylidene chloride co-polymer, about 4% by weight of a mixture consisting of 1 part by weight of lactic acid and 4 parts by weight of mannitol, and the remainder, a solvent selected from the group consisting of amyl acetate and a mixture consisting of 1 part by weight toluene and 1 part by weight of methyl ethyl ketone.

6. A composition for forming a self-fluxing coating on a wire conductor consisting essentially of about 5% by weight of vinyl chloride-vinyl acetate polymer, 5% by weight of a mixture consisting of 1 part lactic acid and 4 parts mannitol and the remainder a solvent consisting of a mixture of 1 part toluene and 1 part methyl ethyl ketone.

References Cited in the file of this patent

UNITED STATES PATENTS

| | | |
|---|---|---|
| 2,011,213 | Ehrenzweig | Aug. 13, 1935 |
| 2,154,057 | Thielking | Apr. 11, 1939 |
| 2,174,912 | Thielking | Oct. 3, 1939 |
| 2,216,234 | Emig | Oct. 1, 1940 |
| 2,258,218 | Rochow | Oct. 7, 1941 |
| 2,323,333 | Kauth | July 6, 1943 |
| 2,324,739 | Stoops et al. | July 20, 1943 |
| 2,417,885 | Powell | Mar. 25, 1947 |